(12) United States Patent
Hoffman (10) Patent No.: US 8,961,357 B2
(45) Date of Patent: Feb. 24, 2015

(54) MULTI-SPEED AUTOMATIC TRANSMISSION

(71) Applicant: Ford Global Technologies, LLC, Dearborn, MI (US)

(72) Inventor: Donald E. Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 13/693,101

(22) Filed: Dec. 4, 2012

(65) Prior Publication Data
US 2014/0155216 A1 Jun. 5, 2014

(51) Int. Cl.
*F16H 3/44* (2006.01)
*F16H 3/78* (2006.01)
*F16H 3/66* (2006.01)

(52) U.S. Cl.
CPC .............. *F16H 3/78* (2013.01); *F16H 3/663* (2013.01); *F16H 3/666* (2013.01); *F16H 2003/445* (2013.01); *F16H 2200/006* (2013.01); *F16H 2200/2007* (2013.01); *F16H 2200/2023* (2013.01); *F16H 2200/2046* (2013.01)
USPC ......................................................... 475/284

(58) Field of Classification Search
CPC ................ F16H 2200/2023; F16H 2200/2025; F16H 2200/2028
USPC .......................................................... 475/284
See application file for complete search history.

(56) References Cited

U.S. PATENT DOCUMENTS

| 7,018,319 | B2 * | 3/2006 | Ziemer ......................... 475/296 |
| 7,914,413 | B2 * | 3/2011 | Nishida et al. ................. 475/275 |
| 7,931,558 | B2 * | 4/2011 | Kato et al. ..................... 475/275 |
| 8,465,386 | B2 * | 6/2013 | Kersting ........................... 475/5 |
| 2005/0202924 | A1 * | 9/2005 | Friedmann et al. ............ 475/275 |

* cited by examiner

*Primary Examiner* — Tisha Lewis
(74) *Attorney, Agent, or Firm* — James Dottavio; MacMillan, Sobanski & Todd, LLC (57) ABSTRACT

A power transmission includes an input, output, a planetary gearset including a first sun gear, a first ring gear, a first carrier driveably connected to the input, first pinions supported on the first carrier and meshing with the first sun gear, and second pinions supported on the first carrier and meshing with the first ring gear and first pinions, and a second planetary gearset including a second sun gear, a third sun gear, a second ring gear driveably connected to the output, a second carrier, third pinions supported on the second carrier and meshing with the second sun gear and second ring gear, and fourth pinions supported on the second carrier and meshing with the third sun gear and the third pinions.

2 Claims, 8 Drawing Sheets

Fig. 1

| Element Number | Number of Teeth |
|---|---|
| 22 | 35 |
| 24 | 80 |
| 28 | 19 |
| 29 | 20 |
| 42 | 35 |
| 44 | 31 |
| 46 | 70 |
| 50 | 17 |
| 52 | 18 |

Fig. 2

| Gear Node | Clutch 56 | Clutch 58 | Clutch 60 | Brake 62 | Clutch 64 | Brake 66 | Ratio |
|---|---|---|---|---|---|---|---|
| 1st | X | | X | X | | | 5.570 |
| 2nd | X | | | X | | X | 4.014 |
| 3rd | X | | X | | | X | 2.523 |
| 4th | X | X | | | | X | 1.778 |
| 5th | X | | | | X | X | 1.240 |
| 6th | X | X | | | X | | 1.000 |
| 7th | | X | | | X | X | 0.821 |
| 8th | | | X | | X | X | 0.667 |
| Rev | | X | | X | | X | −3.556 |
| ADDITIONAL CLUTCH STATES | | | | | | | |
| 10 | | X | X | X | | | −2.000 |
| 11 | X | X | X | | | | 1.000 |
| 12 | X | | X | | X | | 1.000 |
| 13 | | X | X | | X | | 1.000 |

| Element Number | Number of Teeth |
|---|---|
| 22 | 42 |
| 24 | 72 |
| 76 | 15 |
| 42 | 60 |
| 44 | 45 |
| 46 | 108 |
| 50 | 24 |
| 52 | 23 |

Fig. 5

| Gear Node | Clutch 56 | Clutch 58 | Clutch 60 | Brake 62 | Clutch 64 | Brake 66 | Ratio |
|---|---|---|---|---|---|---|---|
| 1st | X | | X | X | | | 4.850 |
| 2nd | X | | | X | | X | 3.800 |
| 3rd | X | | X | | | X | 2.375 |
| 4th | X | X | | | | X | 1.583 |
| 5th | X | | | | X | X | 1.181 |
| 6th | X | X | | | X | | 1.000 |
| 7th | | X | | | X | X | 0.830 |
| 8th | | | X | | X | X | 0.643 |
| Rev | | X | | X | | X | −2.850 |
| ADDITIONAL CLUTCH STATES | | | | | | | |
| 10 | | X | X | X | | | −1.800 |
| 11 | X | X | X | | | | 1.000 |
| 12 | X | | X | | X | | 1.000 |
| 13 | | X | X | | X | | 1.000 |

| Element Number | Number of Teeth |
|---|---|
| 22 | 35 |
| 24 | 80 |
| 28 | 18 |
| 29 | 19 |
| 84 | 35 |
| 86 | 43 |
| 88 | 80 |
| 92 | 19 |
| 94 | 25 |

Fig. 8

| Gear Node | Clutch 56 | Clutch 58 | Clutch 60 | Brake 62 | Clutch 64 | Brake 66 | Ratio |
|---|---|---|---|---|---|---|---|
| 1st | X | | X | X | | | 5.403 |
| 2nd | X | | | X | | X | 3.514 |
| 3rd | X | | X | | | X | 2.284 |
| 4th | X | X | | | | X | 1.778 |
| 5th | X | | | | X | X | 1.284 |
| 6th | X | X | | | X | | 1.000 |
| 7th | | X | | | X | X | 0.847 |
| 8th | | | X | | X | X | 0.708 |
| Rev | | X | | X | | X | -4.317 |
| ADDITIONAL CLUTCH STATES | | | | | | | |
| 10 | | X | X | X | | | -2.429 |
| 11 | X | X | X | | | | 1.000 |
| 12 | X | | X | | X | | 1.000 |
| 13 | | X | X | | X | | 1.000 |

| Element Number | Number of Teeth |
|---|---|
| 102 | 45 |
| 104 | 80 |
| 108 | 13 |
| 110 | 14 |
| 84 | 35 |
| 86 | 43 |
| 88 | 85 |
| 92 | 19 |
| 94 | 25 |

Fig. 11

| Gear Node | Clutch 56 | Clutch 58 | Clutch 60 | Brake 62 | Clutch 64 | Brake 66 | Ratio |
|---|---|---|---|---|---|---|---|
| 1st | X | | X | X | | | 5.403 |
| 2nd | X | | | X | | X | 3.514 |
| 3rd | X | | X | | | X | 2.284 |
| 4th | X | X | | | | X | 1.778 |
| 5th | X | | | | X | X | 1.284 |
| 6th | X | X | | | X | | 1.000 |
| 7th | | X | | | X | X | 0.847 |
| 8th | | | X | | X | X | 0.708 |
| Rev | | X | | X | | X | −4.317 |
| ADDITIONAL CLUTCH STATES | | | | | | | |
| 10 | | X | X | X | | | −2.429 |
| 11 | X | X | X | | | | 1.000 |
| 12 | X | | X | | X | | 1.000 |
| 13 | | | X | X | | X | 1.000 |

Fig. 12

MULTI-SPEED AUTOMATIC TRANSMISSION

BACKGROUND OF THE INVENTION

This invention relates to the field of automatic transmissions for motor vehicles. More particularly, the invention pertains to a kinematic arrangement of gearing, clutches, brakes, and the interconnections among them in a power transmission.

SUMMARY OF THE INVENTION

A power transmission includes an input, output, a planetary gearset including a first sun gear, a first ring gear, a first carrier driveably connected to the input, first pinions supported on the first carrier and meshing with the first sun gear, and second pinions supported on the first carrier and meshing with the first ring gear and first pinions, and a second planetary gearset including a second sun gear, a third sun gear, a second ring gear driveably connected to the output, a second carrier, third pinions supported on the second carrier and meshing with the second sun gear and second ring gear, and fourth pinions supported on the second carrier and meshing with the third sun gear and third pinions.

The transmission produces eight forward gears using six control elements-four clutches and two brakes-with three control elements engaged and three disengaged in each gear. Therefore, potential exists for an open-clutch spin loss advantage compared to transmissions that have four control elements disengaged in each gear.

The transmission provides multiple ways to achieve the direct 1:1 speed ratio in sixth gear, thereby increasing the number of gears that can shift into 6th and out of 6th with a single control element on/off switch.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
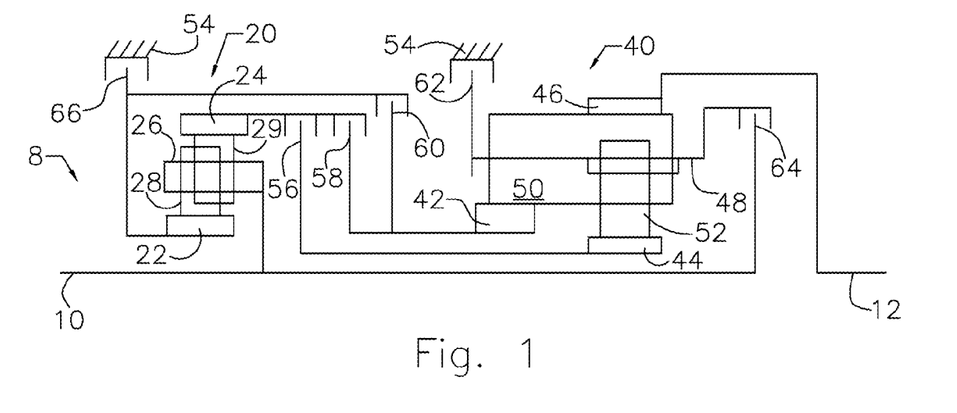
FIG. 1 is a schematic diagram showing a kinematic arrangement of a multi-speed transmission.

A transmission 8 according to a first embodiment is illustrated schematically in FIG. 1. Input shaft 10 is driven by a vehicle engine, preferably through a torque converter. Output shaft 12 drives the vehicle wheels, preferably through a differential.

A dual planetary, epicyclic gearset 20 includes a sun gear 22 having external gear teeth, a ring gear 24 having internal gear teeth, a planet carrier 26 secured to input shaft 10, and two sets of planet pinions 28, 29 supported for rotation on carrier 26-pinions 28 meshing with sun gear 22 and pinions 29 meshing with ring gear 24 and pinions 28.

A Ravigneaux epicyclic gearset 40 includes a sun gear 42 having external gear teeth, a sun gear 44 having external gear teeth, a ring gear 46 having internal gear teeth, a planet carrier 48, a set of planet pinions 50 supported for rotation on carrier 48 and meshing with sun gear 42, pinions 52 and ring gear 46, and a set of planet pinions 52 supported for rotation on carrier 48 and meshing with sun gear 44 and pinions 50.

Carrier 26 is connected directly to input shaft 10. Ring gear 46 is connected directly to the transmission output shaft 12.

Four rotating clutches, preferably multi-plate friction clutches, connect rotating elements to one another such that they rotate as a unit when hydraulic pressure is applied to a hydraulic servo that controls each clutch. Clutch 56 selectively connects ring gear 24 to sun gear 44. Clutch 58 selectively connects ring gear 24 to sun gear 42. Clutch 60 selectively connects sun gear 22 to sun gear 42. Clutch 64 selectively connects carrier 48 to input shaft 10.

Two brakes, preferably multi-plate friction brakes, hold rotating elements against rotation on the transmission casing 54 when hydraulic pressure is applied to a hydraulic servo that controls the brake. Brake 62 selectively holds carrier 48 against rotation. Brake 66 selectively holds sun gear 22 against rotation.

Figure 2:
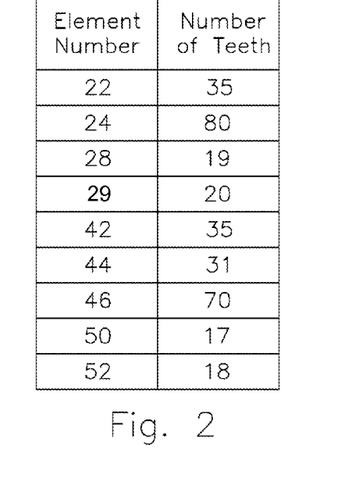
FIG. 2 is a table showing a preferred number of teeth for the gears and pinions of the transmission of FIG. 1.

Suggested tooth numbers for the gears and pinions of FIG. 1 are shown in FIG. 2.

Figure 3:
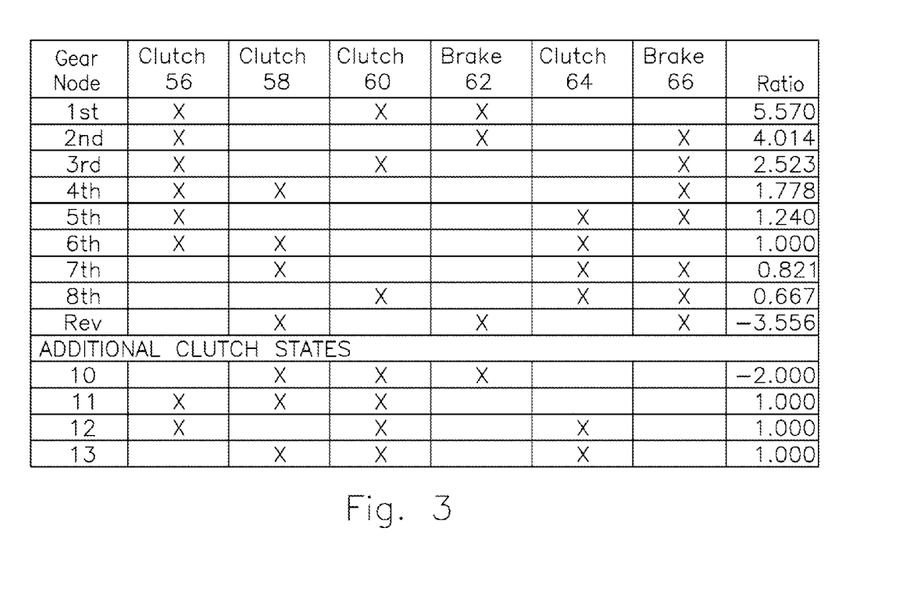
FIG. 3 is a table indicating the states of the clutches and the resulting speed ratios of the transmission of FIG. 1 when the gears have the number of teeth indicated in FIG. 2.

FIG. 3 indicates the states of the clutches and brakes for each of eight forward ratios, a reverse ratio, alternate reverse ratio produced by clutch state 10, and additional clutch states 11-13 for producing a transmission gear ratio of 1.000.

To launch the vehicle from rest in 1st gear, hydraulic pressure is applied to engage clutch 56, clutch 60 and brake 62 while all other brakes and clutches are disengaged.

To shift from 1st gear to 2nd gear, clutch 60 is disengaged, brake 66 is engaged, clutch 56 and brake 62 remain engaged and all other brakes and clutches remain disengaged.

To shift from 2nd gear to 3rd gear, brake 62 is disengaged, clutch 60 is engaged, clutch 56 and brake 66 remain engaged, and all other brakes and clutches remain disengaged.

To shift from 3rd gear to 4th gear, clutch 60 is disengaged, clutch 58 is engaged, clutch 56 and brake 66 remain engaged, and all other brakes and clutches remain disengaged.

To shift from 4th gear to 5th gear, clutch 58 is disengaged, clutch 64 is engaged, clutch 56 and brake 66 remain engaged, and all other brakes and clutches remain disengaged.

To shift from 5th gear to 6th gear, brake 66 is disengaged, clutch 58 is engaged, clutch 56 and clutch 64 remain engaged, and all other brakes and clutches remain disengaged. Clutch 56 remains engaged while operating in 1st through 6th gears.

To shift from 6th gear to 7th gear, clutch 56 is disengaged, brake 66 is engaged, clutch 58 and clutch 64 remain engaged, and all other brakes and clutches remain disengaged.

To shift from 7th gear to 8th gear, clutch 58 is disengaged, clutch 60 is engaged, brake 66 and clutch 64 remain engaged, and all other brakes and clutches remain disengaged.

Reverse gear is selected by applying clutch 58, brake 62 and brake 66, while disengaging all other brakes and clutches.

Transmission 8 has a tenth state in which clutch 58, clutch 60 and brake 62 are engaged to produce a gear ratio of −2.00; an eleventh state in which clutch 56, clutch 58 and clutch 60 are engaged to produce a gear ratio of 1.00; a twelfth state in which clutch 56, clutch 60 and clutch 64 are engaged to produce a gear ratio of 1.00; and a thirteenth state in which clutch 58, clutch 60 and clutch 64 are engaged to produce a gear ratio of 1.00.

Figure 4:
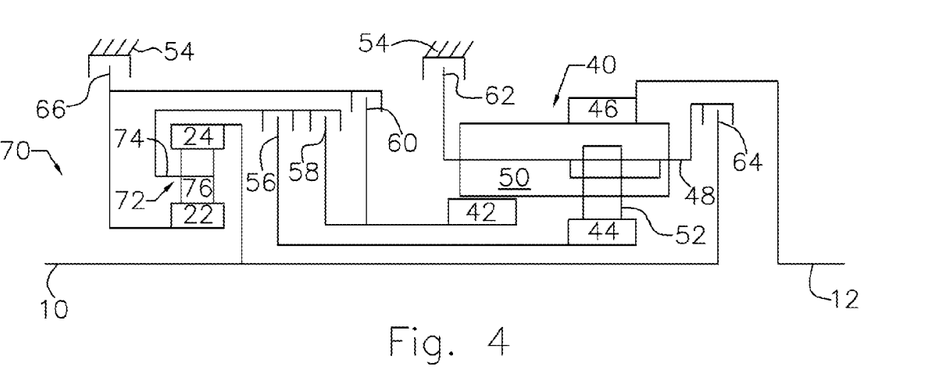
FIG. 4 is a schematic diagram showing a kinematic arrangement of a multi-speed transmission.

FIG. 4 is a schematic diagram of a second embodiment comprising transmission 70, which has the same kinematic arrangement as that of transmission 8, except that planetary gearset 20 is replaced by gearset 72, which is a simple planetary gearset that includes a pinion carrier 74 and pinions 76 supported on the carrier and meshing with sun gear 22 and ring gear 24. Input shaft 10 is secured to ring gear 24, carrier 74 is connected to clutches 56 and 58, and sun gear 22 is connected to brake 66 and clutch 60.

Figure 5:
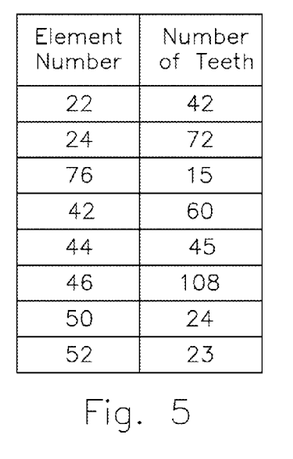
FIG. 5 is a table showing a preferred number of teeth for the gears and pinions of the transmission of FIG. 4.

The preferred number of teeth for the gears and pinions of FIG. 4 are shown in FIG. 5.

Four rotating clutches, preferably multi-plate friction clutches, connect rotating elements to one another such that they rotate as a unit when hydraulic pressure is applied to a hydraulic servo that controls each clutch. Clutch 56 selectively connects carrier 74 to sun gear 44. Clutch 58 selectively connects carrier 74 to sun gear 42. Clutch 60 selectively connects sun gear 22 to sun gear 42. Clutch 64 selectively connects carrier 48 to input shaft 10.

Two brakes, preferably multi-plate friction brakes, hold rotating elements against rotation on the transmission casing 54 when hydraulic pressure is applied to a hydraulic servo that controls each brake. Brake 62 selectively holds carrier 48 against rotation. Brake 66 selectively holds sun gear 22 against rotation.

Figure 6:
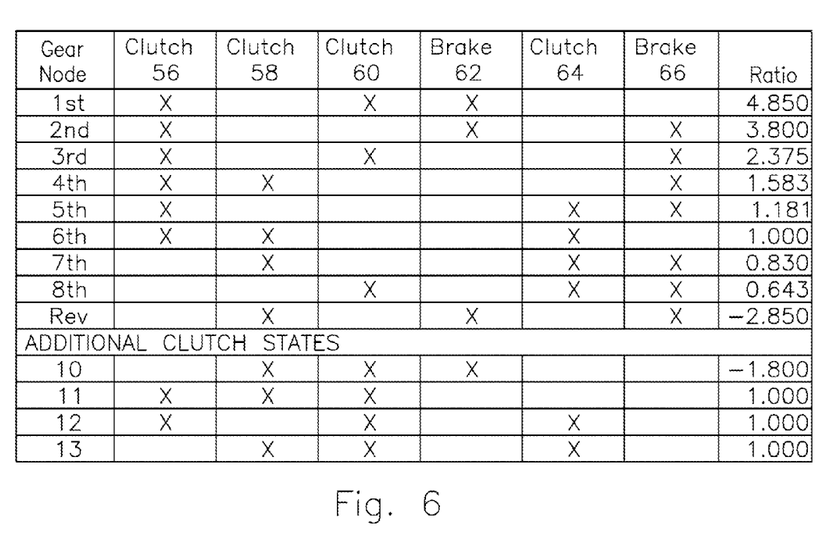
FIG. 6 is a table indicating the states of the clutches and the resulting speed ratios of the transmission of FIG. 4 when the gears have the number of teeth indicated in FIG. 5.

FIG. 6 indicates the states of the clutches and brakes for each of eight forward ratios, a reverse ratio, alternate reverse ratio produced by clutch state 10, and additional clutch states 11-13 for producing a transmission gear ratio of 1.000. Transmission 70 has a tenth state in which clutch 58, clutch 60 and brake 62 are engaged to produce a gear ratio of −1.800; an eleventh state in which clutch 56, clutch 58 and clutch 60 are engaged to produce a gear ratio of 1.00; a twelfth state in which clutch 56, clutch 60 and clutch 64 are engaged to produce a gear ratio of 1.00; and a thirteenth state in which clutch 58, clutch 60 and clutch 64 are engaged to produce a gear ratio of 1.00.

Figure 7:
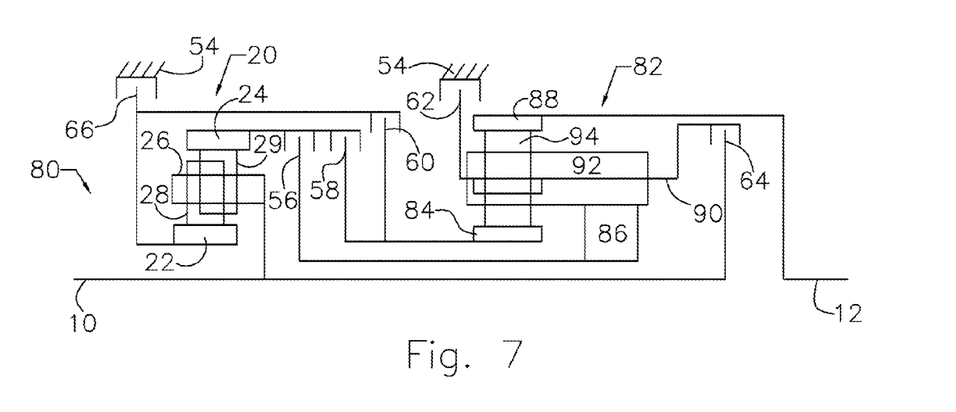
FIG. 7 is a schematic diagram showing a kinematic arrangement of a multi-speed transmission.

FIG. 7 is a schematic diagram of a third embodiment comprising transmission 80, which has the same kinematic arrangement as that of transmission 8, except that the Ravigneaux gearset 40 is reconfigured to change the beta ratio, thereby producing a preferred step progression.

The Ravigneaux gearset 82 of transmission 80 includes a sun gear 84 having external gear teeth, a sun gear 86 having external gear teeth, a ring gear 88 having internal gear teeth, a planet carrier 90, a set of planet pinions 92 supported for rotation on carrier 90 and meshing with sun gear 86, and a set of planet pinions 94 supported for rotation on carrier 90 and meshing with sun gear 84, pinions 92 and ring gear 88.

Figure 8:
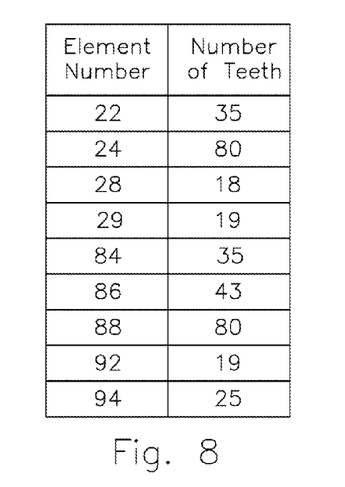
FIG. 8 is a table showing a preferred number of teeth for the gears and pinions of the transmission of FIG. 7.

The preferred number of teeth for the gears and pinions of FIG. 7 are shown in FIG. 8.

Four rotating clutches, preferably multi-plate friction clutches, connect rotating elements to one another such that they rotate as a unit when hydraulic pressure is applied to a hydraulic servo that controls each clutch. Clutch 56 selectively connects ring gear 24 to sun gear 86. Clutch 58 selectively connects ring gear 24 to sun gear 84. Clutch 60 selectively connects sun gear 22 to sun gear 84. Clutch 64 selectively connects carrier 90 to input shaft 10.

Two brakes, preferably multi-plate friction brakes, hold rotating elements against rotation on the transmission casing 54 when hydraulic pressure is applied to a hydraulic servo that controls each brake. Brake 62 selectively holds carrier 90 against rotation. Brake 66 selectively holds sun gear 22 against rotation.

Figure 9:
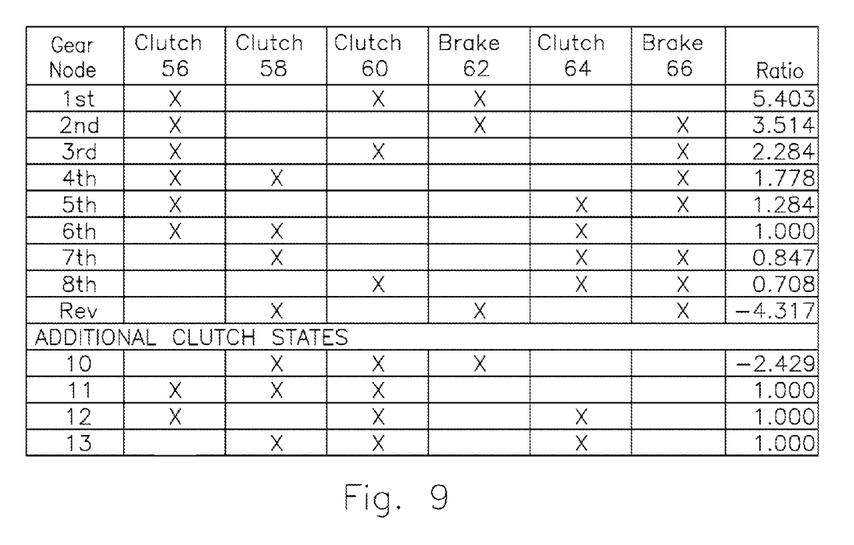
FIG. 9 is a table indicating the states of the clutches and the resulting speed ratios of the transmission of FIG. 7 when the gears have the number of teeth indicated in FIG. 8.

FIG. 9 indicates the states of the clutches and brakes for each of eight forward ratios, a reverse ratio, alternate reverse ratio produced by clutch state 10, and additional clutch states 11-13 for producing a transmission gear ratio of 1.000. Transmission 80 has a tenth state in which clutch 58, clutch 60 and brake 62 are engaged to produce a gear ratio of −2.429; an eleventh state in which clutch 56, clutch 58 and clutch 60 are engaged to produce a gear ratio of 1.00; a twelfth state in which clutch 56, clutch 60 and clutch 64 are engaged to produce a gear ratio of 1.00; and a thirteenth state in which clutch 58, clutch 60 and clutch 64 are engaged to produce a gear ratio of 1.00.

Figure 10:
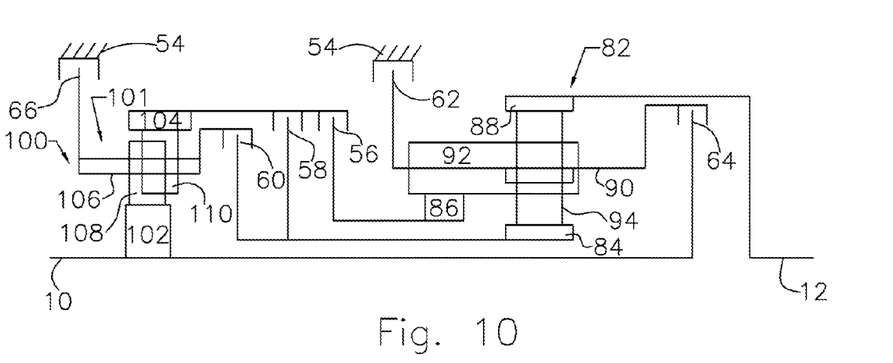
FIG. 10 is a schematic diagram showing a kinematic arrangement of a multi-speed transmission.

FIG. 10 is a schematic diagram of a fourth embodiment comprising transmission 100. The Ravigneaux gearset 82 is the same as the Ravigneaux gearset of FIG. 7 except sun gear 84, sun gear 86, ring gear 88, and pinion gear 94 are transposed axially.

A dual planetary, epicyclic gearset 101 includes a sun gear 102 having external gear teeth and secured to input shaft 10; a ring gear 104 having internal gear teeth and connected to clutches 56, 58; a planet carrier 106 connected to brake 66 and clutch 60, and two sets of planet pinions 108, 110, supported for rotation on carrier 106-pinions 108 meshing with sun gear 102, pinions 110 meshing with ring gear 104 and pinions 108.

Figure 11:
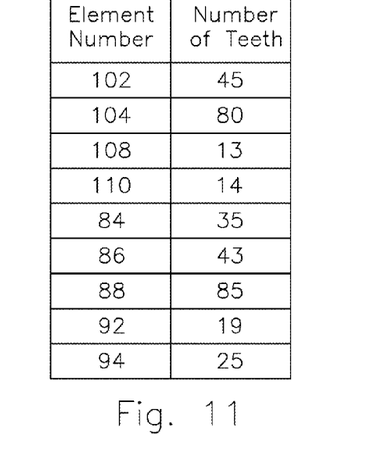
FIG. 11 is a table showing a preferred number of teeth for the gears and pinions of the transmission of FIG. 10.

The preferred number of teeth for the gears and pinions of FIG. 10 are shown in FIG. 11.

Four rotating clutches, preferably multi-plate friction clutches, connect rotating elements to one another such that they rotate as a unit when hydraulic pressure is applied to a hydraulic servo that controls each clutch. Clutch 56 selectively connects ring gear 104 to sun gear 86. Clutch 58 selectively connects ring gear 104 to sun gear 84. Clutch 60 selectively connects carrier 106 to sun gear 84. Clutch 64 selectively connects carrier 90 to input shaft 10.

Two brakes, preferably multi-plate friction brakes, hold rotating elements against rotation on the transmission casing 54 when hydraulic pressure is applied to a hydraulic servo that controls each brake. Brake 62 selectively holds carrier 90 against rotation. Brake 66 selectively holds carrier 106 against rotation.

Figure 12:
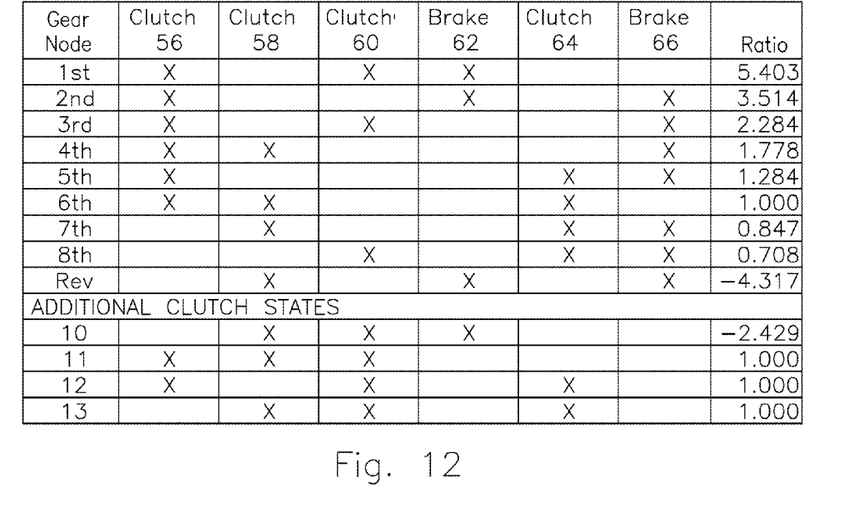
FIG. 12 is a table indicating the states of the clutches and the resulting speed ratios of the transmission of FIG. 10 when the gears have the number of teeth indicated in FIG. 11.

FIG. 12 indicates the states of the clutches and brakes for each of eight forward ratios, a reverse ratio, an alternate reverse ratio produced by clutch state 10, and additional clutch states 11-13 for producing a transmission gear ratio of 1.000. Transmission 100 has a tenth state in which clutch 58, clutch 60 and brake 62 are engaged to produce a gear ratio of −2.429; an eleventh state in which clutch 56, clutch 58 and clutch 60 are engaged to produce a gear ratio of 1.00; a twelfth state in which clutch 56, clutch 60 and clutch 64 are engaged to produce a gear ratio of 1.00; and a thirteenth state in which clutch 58, clutch 60 and clutch 64 are engaged to produce a gear ratio of 1.00.

In accordance with the provisions of the patent statutes, the preferred embodiment has been described. However, it should be noted that the alternate embodiments can be practiced otherwise than as specifically illustrated and described.

The invention claimed is:

1. A power transmission, comprising:
   an input;
   an output;
   a planetary gearset including:
      a first sun gear;
      a first ring gear;
      a first carrier driveably connected directly to the input;
      first pinions supported on the first carrier and meshing with the first sun gear;
      second pinions supported on the first carrier and meshing with the first ring gear and first pinions;
   a second planetary gearset including:
      a second sun gear;
      a third sun gear;
      a second ring gear driveably connected to the output;
      a second carrier;
      third pinions supported on the second carrier and meshing with the second sun gear and the second ring gear;
      fourth pinions supported on the second carrier and meshing with the third sun gear and the third pinions;
   a first clutch for releasably connecting the first ring gear and the third sun gear;
   a second clutch for releasably connecting the first ring gear and the second sun gear;
   a first brake for releasably holding the second carrier against rotation;
   a second brake for releasably holding the first sun gear against rotation;
   a third clutch for releasably connecting the first sun gear and the second sun gear;
   a fourth clutch for releasably connecting the second carrier and the input.

2. The power transmission of claim 1, wherein each forward gear and reverse gear produced by the transmission results from concurrent engagement of three of the clutches and brakes and concurrent disengagement of three of the clutches and brakes.

* * * * *